(12) United States Patent
Smith et al.

(10) Patent No.: US 7,724,068 B1
(45) Date of Patent: May 25, 2010

(54) BANDGAP-REFERENCED THERMAL SENSOR

(75) Inventors: Paul AD Smith, Glasgow (GB); Paul Wilson, West Lothian (GB)

(73) Assignee: Micrel, Incorporated, San Jose, CA (US)

( * ) Notice: Subject to any disclaimer, the term of this patent is extended or adjusted under 35 U.S.C. 154(b) by 0 days.

(21) Appl. No.: 12/327,699

(22) Filed: Dec. 3, 2008

(51) Int. Cl.
*G05F 1/10* (2006.01)
(52) U.S. Cl. .................................. 327/513; 327/539
(58) Field of Classification Search ................ 327/512, 327/513, 539
See application file for complete search history.

(56) References Cited

U.S. PATENT DOCUMENTS

| | | | | |
|---|---|---|---|---|
| 5,838,187 | A * | 11/1998 | Embree | 327/512 |
| 7,084,695 | B2 * | 8/2006 | Porter | 327/512 |
| 7,579,899 | B2 * | 8/2009 | Senriuchi et al. | 327/512 |
| 7,581,882 | B2 * | 9/2009 | Noguchi | 374/178 |
| 2005/0099752 | A1 * | 5/2005 | Liepold et al. | 361/103 |
| 2007/0070760 | A1 * | 3/2007 | Kim | 365/212 |
| 2007/0152649 | A1 * | 7/2007 | Liu | 323/315 |
| 2007/0159237 | A1 * | 7/2007 | Zimlich | 327/539 |
| 2008/0192804 | A1 * | 8/2008 | Ryu | 374/178 |
| 2008/0279254 | A1 * | 11/2008 | Liu | 374/178 |
| 2009/0256623 | A1 * | 10/2009 | Tajima | 327/512 |
| 2009/0289321 | A1 * | 11/2009 | Li et al. | 257/467 |

OTHER PUBLICATIONS de Rooij et al.: "Development of a 1MHz MOSFET Gate-Driver for Integrated Converters", 2002 IEEE, pp. 2622-2629.
Gray et al.: "Analysis and Design of Analog Integrated Circuits", 1977, 1984 John Wiley & Sons, 27 pages.

* cited by examiner

*Primary Examiner*—Lincoln Donovan
*Assistant Examiner*—Thomas J Hiltunen
(74) *Attorney, Agent, or Firm*—Bever, Hoffman & Harms, LLP; Patrick T. Bever

(57) ABSTRACT

A thermal sensor for an integrated circuit including a bandgap reference circuit. The thermal sensor includes a comparator that compares a temperature dependent voltage generated by the bandgap reference circuit to a temperature independent voltage, where both temperatures are referenced to the bandgap reference voltage generated by the bandgap reference circuit. The thermal sensor generates a digital output control signal based on a predetermined relationship between the temperature dependent voltage and the temperature independent reference voltage. When used as a thermal shutdown circuit, the comparator generates a thermal shut-down signal when the dependent temperature voltage decreases (or increases) with rising system temperature to equal to the temperature independent reference voltage. The comparator is implemented using an operational amplifier that is connected to existing circuitry associated with the bandgap reference circuit.

6 Claims, 4 Drawing Sheets

BANDGAP-REFERENCED THERMAL SENSOR

FIELD OF THE INVENTION

This invention relates to integrated circuits, and more particularly to integrated circuits that include both bandgap reference circuits and thermal sensor circuits (e.g., thermal shutdown circuits).

BACKGROUND OF THE INVENTION

FIG. 4 is a simplified circuit diagram showing an integrated circuit 50 including a conventional bandgap reference circuit 51 for generating a bandgap reference voltage $V_{bg}$, a conventional thermal shutdown circuit 52 for generating a thermal shutdown control signal TSD, and a generalized functional circuit (e.g., a Power Management IC circuit) 53 that utilizes bandgap reference voltage $V_{bg}$ during normal operation and is shutdown by thermal shutdown control signal TSD when an operating temperature of IC 50 equals or exceeds a predetermined maximum operating temperature.

Referring to the left side of FIG. 4, bandgap reference circuit 51 includes an operational amplifier (op amp) C1 that generates bandgap reference voltage $V_{bg}$ at its output terminal. The non-inverting (+) input terminal of bandgap reference circuit 51 is connected between a resistor R1 and a diode Q1, which are connected in series between bandgap reference voltage $V_{bg}$ and ground. The inverting (−) input terminal of bandgap reference circuit 51 is connected between resistors R2 and R3, which are connected in series with a diode Q2 between bandgap reference voltage $V_{bg}$ and ground. Those skilled in the art recognize that bandgap reference circuit 51 represents only one of several possible circuit arrangements capable of generating the desired bandgap reference voltage $V_{bg}$. The particular circuit structure of bandgap reference circuit 51 is disclosed in Chapter 4, Appendix A4.3 of "Analysis and Design of Analog Integrated Circuits $2^{ND}$ Edition", Paul R. Gray and Robert G. Meyer (copyright 1977 by Wiley & Sons, Inc.).

In general, bandgap reference circuits function as temperature independent voltage reference circuits to provide a bandgap reference voltage $V_{bg}$ at a voltage level typically around 1.25 V, which is close to the theoretical 1.22 eV bandgap of silicon at 0° K. In the example shown in FIG. 4, when power is supplied to IC 50, bandgap reference circuit 51 operates as follows. Assuming a stable operating point exists, then the differential input voltage of op amp C1 must be zero, and resistors R1 and R2 have equal voltages across them. Thus, the two currents $I_1$ and $I_2$ must have a ratio determined by the ratio of resistors R1 to R2. These two currents are the collector currents of the two diodes Q1 and Q2 (e.g., diode-connected transistors), assuming base currents are negligible. Thus, the difference between their base-emitter voltages can be represented by Equation 1:

$$\Delta V_{be} = V_T \ln \frac{I_1}{I_2} \cdot \frac{I_{S2}}{I_{S1}} = V_T \ln \frac{R2}{R1} \cdot \frac{I_{S2}}{I_{S1}} \qquad \text{Eq. 1}$$

where $V_T$ is the threshold voltage across resistor R3, and $I_{S1}$ and $I_{S2}$ represent the saturation currents of diodes Q1 and Q2, respectively. The same current that flows through resistor R3 also flows through resistor R2, so the voltage across resistor R2 is represented by Equation 2:

$$V_{R2} = \frac{R2}{R3} \cdot \Delta V_{be} = \frac{R2}{R3} \cdot V_T \ln \frac{R2}{R1} \cdot \frac{I_{S2}}{I_{S1}} \qquad \text{Eq. 2}$$

Note that Eq. 2 implies that the currents $I_1$ and $I_2$ are both proportional to temperature if the resistors have zero temperature coefficient. The output voltage of op amp C1 (i.e., bandgap reference voltage $V_{bg}$) is thus represented by Equation 3:

$$V_{bg} = V_{be} + \frac{R2}{R3} \cdot V_T \ln \frac{R2}{R1} \cdot \frac{I_{S2}}{I_{S1}} = V_{be} + KV_T \qquad \text{Eq. 3}$$

Eq. 3 implies that bandgap reference voltage $V_{bg}$ is substantially independent of temperature, with the constant K set by the ratios of R2/R1, R2/R3 and $I_{S2}/I_{S1}$.

Referring again to FIG. 4, due to process variations and component mismatches typically encountered during the production of integrated circuits, bandgap reference circuit 51 is typically designed in a way that allows "trimming" of resistors R1, R2 and R3 at the end of the fabrication process in order to produce the desired bandgap reference voltage $V_{bg}$. This trimming process typically involves providing several resistors connected in series, and a mechanism (e.g., programmable elements) that can be used to bypass some of the resistors in order to supply accurate voltages to op amp C1. An exemplary trimmable resistor circuit is shown in FIG. 5, where resistors R21 to R24 are connected in series, with each node N21 to N23 between adjacent resistors connected to op amp C1 by way of programmable elements (e.g., fuses, antifuses or pass gates) P1 to P3. In this example, resistor R2 (see FIG. 4) is trimmed by selectively turning on zero or more of programmable elements P1 to P3. For example, the resistance of resistor R2 is minimized by closing programmable element P1 such that op amp C1 is coupled to bandgap reference voltage $V_{bg}$ by way of node N21, whereby the total resistance of resistor R2 is equal to the resistance of resistor R21. Conversely, resistor R2 is maximized by leaving open all programmable elements P11 to P13 such that op amp C1 is coupled to bandgap reference voltage $V_{bg}$ by way of node N24, whereby the total resistance of resistor R2 is equal to the sum of the resistances of resistors R21+R22+R23+R24.

Referring again to FIG. 4, one further common practice associated with the production of ICs including bandgap reference circuits is to provide a series of resistors $R_A$ to $R_D$ that are connected to bandgap reference voltage $V_{bg}$, and provide temperature independent reference voltage $V_{REF1}$ to $V_{REF3}$, which are tapped from node $N_{AB}$, $N_{BC}$ and $N_{CD}$, respectively. Reference voltages between $V_{bg}$ and GND are easily generated for various PMIC functions.

Referring again to FIG. 4, thermal shutdown circuit 52 includes a thermal sensor 55 whose voltage is compared by an op amp 57 to a supplied reference voltage $V_{REF}$, whereby thermal shutdown control signal TSD when the sensor voltage $V_{SENSOR}$ is equal to the reference voltage. Such thermal shutdown circuits are described, for example, in "Development of a 1 MHz MOSFET gate-driver for integrated converters", M. A. de Rooij, J. T. Strydom and J. D. van Wyk, P. Beamer (IEEE publication 0-7803-7420-7/02 (2002)), in which the disclosed thermal sensor uses is a thermistor whose output signal is dedicated to the thermal shutdown of a functional circuit.

A problem associated with including thermal shutdown circuit 52 is that thermistor 55 and its associated circuitry are additional to any other thermally sensitive circuitry present on an IC having a bandgap reference circuit, and therefore take up a significant amount of valuable silicon area, consume a significant amount of power, and typically require a separate trimming operation (i.e., in addition to the trimming operation mentioned above with reference to bandgap reference circuit 51).

What is needed is a thermal shutdown circuit that minimizes silicon area and power consumption, and simplifies the trimming operations associated with its host IC.

SUMMARY OF THE INVENTION

The present invention is directed to a thermal sensor that compares a temperature dependent voltage to a temperature independent voltage, both temperatures being referenced to a bandgap reference voltage, and generates a digital output control signal based on a predetermined relationship between the temperature dependent voltage and the temperature independent reference voltage. For example, the thermal sensor may serve as a thermal shutdown circuit that generates a thermal shut-down signal when the dependent temperature voltage is equal to the temperature independent reference voltage.

In accordance with an aspect of the invention, the temperature dependent and temperature independent voltages utilized by the thermal shutdown circuit are tapped from existing bandgap reference circuitry, thereby providing an accurate thermal sensor output signal simply by adding a circuit that operably compares two selected voltages. The conventional bandgap reference circuits provided on most integrated circuits (ICs) typically include circuit structures (e.g., series-connected resistors/diodes) that that produce temperature dependent voltages having diverging temperature coefficients, and these temperature dependent voltages are combined by the bandgap reference circuit to provide the substantially temperature independent bandgap reference voltage. In addition, these conventional bandgap reference circuits include mechanisms (e.g., trimmable resistors, discussed above) that allow accurate adjustment (trimming) of the bandgap reference voltage to the desired voltage level. Further, each such IC typically includes one or more voltage dividers referenced to the bandgap reference voltage that provide reliable temperature independent reference voltages utilized by the functional circuitry of the IC. The present invention takes advantage of this existing bandgap reference circuitry simply by adding a selected comparator (e.g., an op amp) and providing metal lines that connect to selected nodes at which selected temperature dependent and temperature independent voltages are already generated. The present invention thereby facilitates minimizing the amount of space and power utilized by a thermal sensor added to an IC having a bandgap reference circuit, particularly when compared to conventional thermal shutdown approaches that utilize a dedicated thermistor and associated bias circuitry.

Another advantage of the present invention is that, in trimming the bandgap voltage, the temperature dependent and temperature independent voltages utilized by the thermal sensor are also trimmed "for free". That is, the present invention eliminates the separate trim operations for the bandgap reference circuit and the thermal sensor that are required by conventional approaches, thereby further reducing manufacturing costs by automatically trimming of the thermal sensor when the bandgap reference is trimmed (i.e., the bandgap reference circuit and the thermal sensor are trimmed simultaneously).

BRIEF DESCRIPTION OF THE DRAWINGS

These and other features, aspects and advantages of the present invention will become better understood with regard to the following description, appended claims, and accompanying drawings, where:

DETAILED DESCRIPTION OF THE DRAWINGS

The present invention relates to an improvement in integrated circuits incorporating bandgap reference voltages and thermal shutdown functionality. The following description is presented to enable one of ordinary skill in the art to make and use the invention as provided in the context of a particular application and its requirements. The terms "coupled" and "connected", which are utilized herein, are defined as follows. The term "connected" is used to describe a direct connection between two circuit elements, for example, by way of a metal line formed in accordance with normal integrated circuit fabrication techniques. In contrast, the term "coupled" is used to describe either a direct connection or an indirect connection between two circuit elements. For example, two coupled elements may be directly connected by way of a metal line, or indirectly connected by way of an intervening circuit element (e.g., a capacitor, resistor, inductor, or by way of the source/drain terminals of a transistor). Various modifications to the preferred embodiment will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

Figure 1:
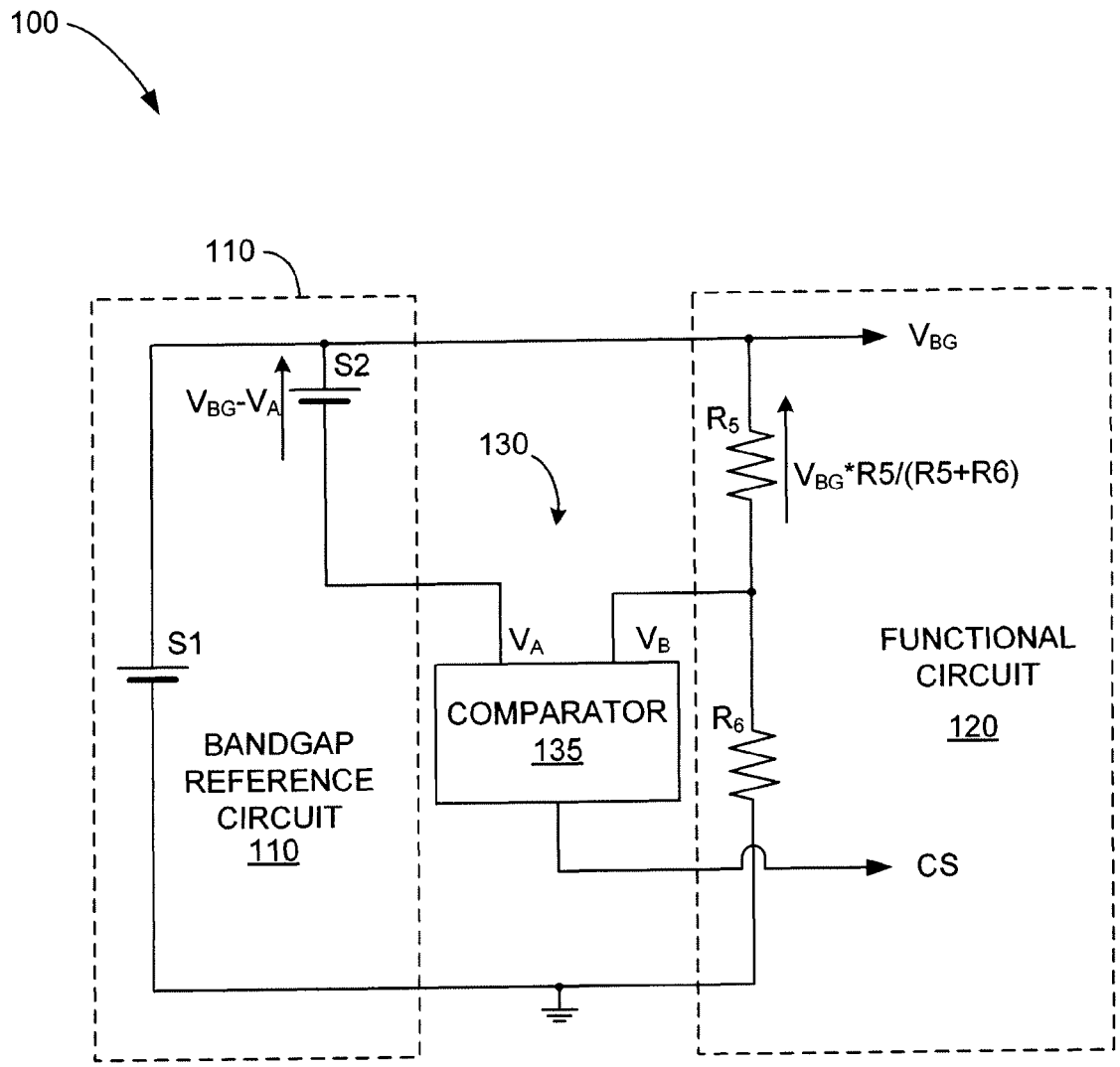
FIG. 1 is a simplified circuit diagram showing a integrated circuit including a thermal shutdown circuit according to a generalized embodiment of the present invention.
Figure 4:
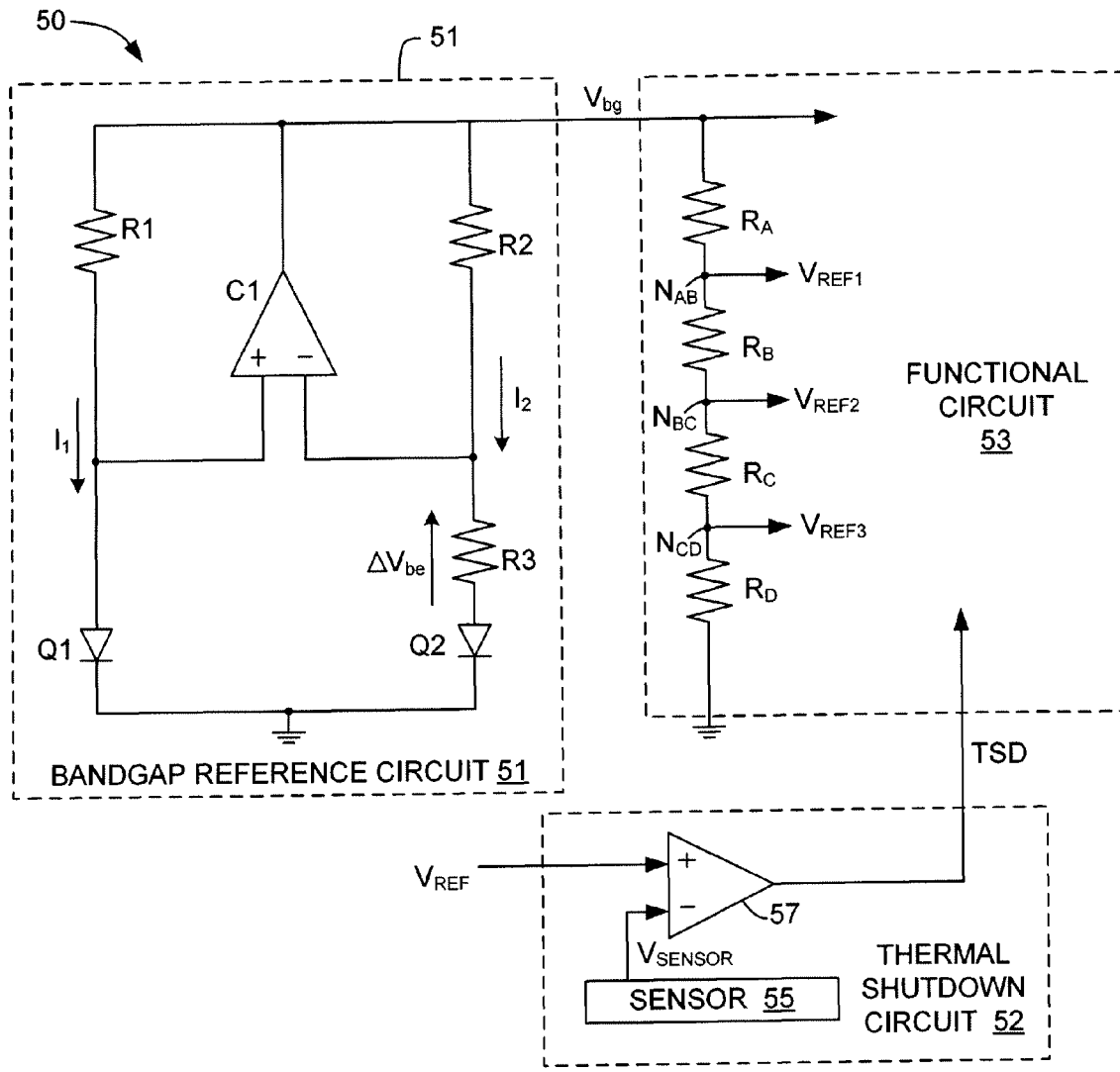
FIG. 4 is a circuit diagram illustrating a conventional bandgap reference circuit.

FIG. 1 is a simplified circuit diagram showing an IC 100 including a generalized bandgap reference circuit 110 and a functional circuit 120 that are similar to those found in conventional ICs. Bandgap reference circuit 110, which is intended to represent any of several well-know architectures, includes voltage sources S1 and S2 that respectively generate a bandgap reference voltage $V_{bg}$ and a temperature dependent voltage $V_A$ according to known techniques, where temperature dependent voltage $V_A$ is referenced to bandgap reference voltage $V_{bg}$, and is proportional to absolute temperature (PTAT). As used herein, the phrase "referenced to bandgap reference voltage $V_{bg}$" is intended to mean that bandgap reference voltage $V_{bg}$ serves as a supply voltage from which the referenced voltage (e.g., temperature dependent voltage $V_A$) is derived. Referring to the right side of FIG. 1, in addition to application specific circuitry (not shown) designed to perform a predetermined function (e.g., to perform the functions of a Power Management IC), functional circuit 120 includes series-connected resistors $R_5$ and $R_6$ that are connected between bandgap reference voltage $V_{bg}$ and ground. As described above with reference to FIG. 4, such series-connected resistors (voltage dividers) are typically included on integrated circuits having bandgap circuitry to provide temperature independent reference voltages that are less than bandgap reference voltage $V_{bg}$.

In accordance with the present invention, IC 100 also includes a thermal sensor 130 including a comparator 135 that is operably connected to compare temperature dependent voltage $V_A$ with a selected temperature independent voltage $V_B$, and to generates a digital output control signal CS (e.g., a thermal shut-down signal) whose voltage/current level is determined by a selected relationship between temperature dependent voltage $V_A$ and temperature independent voltage $V_B$. For example, source S1 and resistors $R_5$ and $R_6$ may be selected such that temperature dependent voltage $V_A$ and temperature independent voltage $V_B$ when both voltages are equal when die temperature of IC 100 has reached or exceeded a safe operating point. Alternatively, the voltage level of control signal CS may increase or decrease in response to ambient temperature, thereby facilitating data that may be used for thermal analysis of IC 100.

As set forth above, in accordance with an aspect of the invention, temperature dependent voltage $V_A$ and temperature independent voltage $V_B$ utilized by thermal sensor 130 are tapped from existing bandgap reference circuitry. That is, temperature dependent voltage $V_A$ is generated by bandgap reference circuit 110 in order to generate bandgap reference voltage $V_{bg}$ in a manner similar to that described above with reference to FIG. 4. Similarly, temperature independent voltage $V_B$ is generated by series-connected resistors $R_5$ and $R_6$, which are typically provided in functional circuit 120 as a voltage divider for providing temperature independent reference signals to the application specific circuitry (not shown) of functional circuit 120. For example, referring to FIG. 4, resistors $R_5$ and $R_6$ may be implemented by tapping node $N_{AB}$, whereby resistor $R_5$ has the effective resistance of resistor $R_A$, and resistor $R_6$ has the effective resistance of resistors $R_B+R_C+R_D$. Alternatively, resistors $R_5$ and $R_6$ may be implemented by tapping node $N_{BC}$, whereby resistor $R_5$ has the effective resistance of resistors $R_A+R_B$, and resistor $R_6$ has the effective resistance of resistors $R_C+R_D$. The value of control signal CS is dependent on how the voltages $V_A$ and $V_B$ are selected, but crucially they must remain referenced to bandgap reference voltage $V_{bg}$ so that they are trimmed correctly, as described below. As such, thermal sensor 130 provides an accurate thermal reading simply by adding comparator 135 to an existing bandgap design, and connecting the input terminals of comparator 135 to carefully selected nodes that are referenced to bandgap reference voltage $V_{bg}$ by way of metal lines metal lines added to the existing metallization process that extend between input terminals of comparator 135 and nodes on which temperature dependent voltage $V_A$ and temperature independent voltage $V_B$ are generated. Because the present invention only requires the addition of comparator circuit 135 (and associated connections), the present invention is implemented using a smaller amount of costly silicon area and exhibits lower power consumption in comparison to conventional approaches that utilize a dedicated thermistor and associated bias circuitry.

Figure 5:
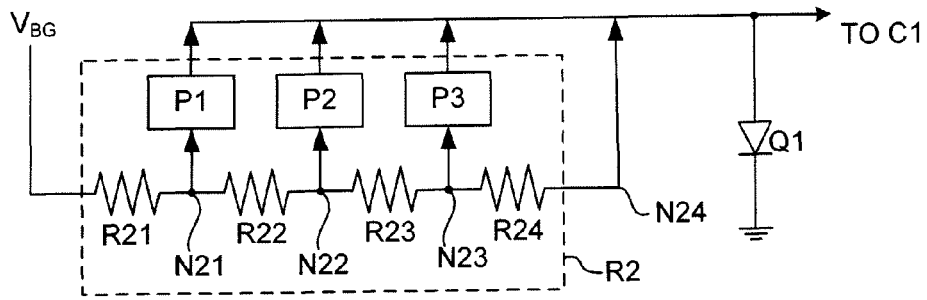
FIG. 5 is a simplified diagram illustrating a trimmable resistor circuit utilized by conventional bandgap reference circuits.

According to another aspect of the present invention, because both temperature dependent voltage $V_A$ and temperature independent voltage $V_B$ are referenced to bandgap reference voltage $V_{BE}$, the act of trimming bandgap reference voltage $V_{BE}$ (e.g., as described above with reference to FIGS. 4 and 5), both temperature dependent voltage $V_A$ and temperature independent voltage $V_B$ are also trimmed "for free". That is, the trimming operation performed to trim bandgap reference voltage $V_{BE}$ also serves to trim thermal sensor 130. As such, the present invention eliminates the separate trim operation required in conventional approaches, thereby reducing manufacturing costs.

Figure 2:
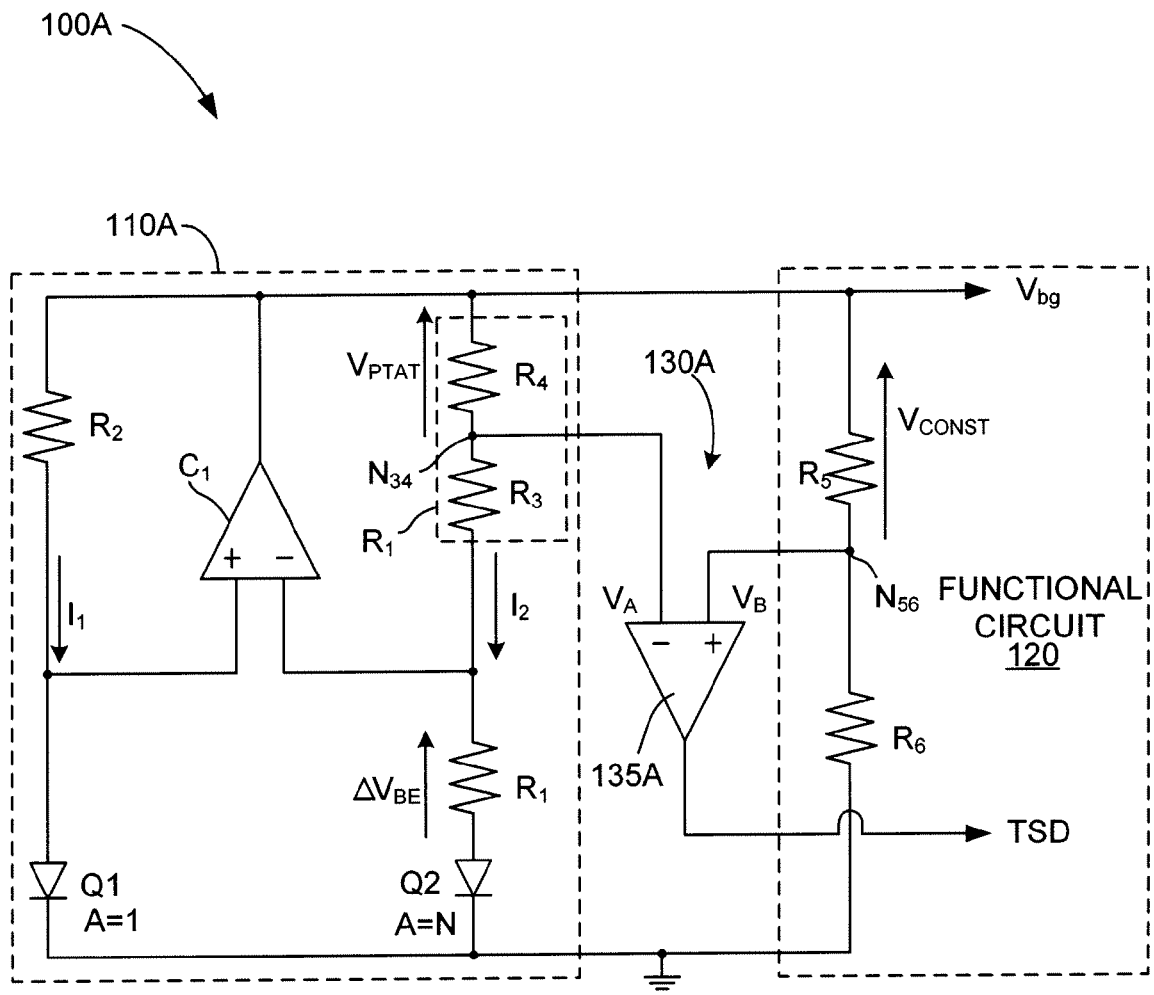
FIG. 2 is simplified circuit diagram showing an integrated circuit including a thermal shutdown circuit according to a specific embodiment of the present invention.

FIG. 2 is a simplified circuit diagram showing an IC 100A according to an exemplary specific embodiment of the present invention. IC 100A includes bandgap reference circuit 110A, which is substantially identical to conventional bandgap reference circuit 50 (described above with reference to FIGS. 4 and 5), a functional circuit 120 including resistors R5 and R6 (both described above), and a thermal shutdown circuit (sensor) 130A.

Bandgap reference circuit 110A and functional circuit 120 are arranged and operate substantially in the manner described above with reference to FIG. 4. Bandgap reference circuit 110A includes an op amp (comparator) $C_1$ that generates bandgap reference voltage $V_{bg}$ at its output terminal, a resistor $R_2$ connected in series with a diode Q1 between bandgap reference voltage $V_{bg}$ and ground, and resistors $R_1$, $R_3$ and $R_4$ that are connected in series with a diode Q2 between bandgap reference voltage $V_{bg}$ and ground. The non-inverting (+) terminal of op amp $C_1$ is connected to a node between resistor $R_2$ and diode Q1, and the inverting (−) terminal of op amp $C_1$ is connected to a node between resistors $R_1$ and $R_3$. Similar to the arrangement described above with reference to FIGS. 4 and 5, bandgap reference circuit 110A is trimmed by adjusting the resistance of one or more of resistors $R_1$ to $R_4$ until bandgap reference voltage $V_{bg}$ achieves a desired voltage level. Similar to the generalized embodiment (described above with reference to FIG. 1), functional circuit 120 includes series-connected resistors $R_5$ and $R_6$ that are connected between bandgap reference voltage $V_{bg}$ and ground.

Figure 3:
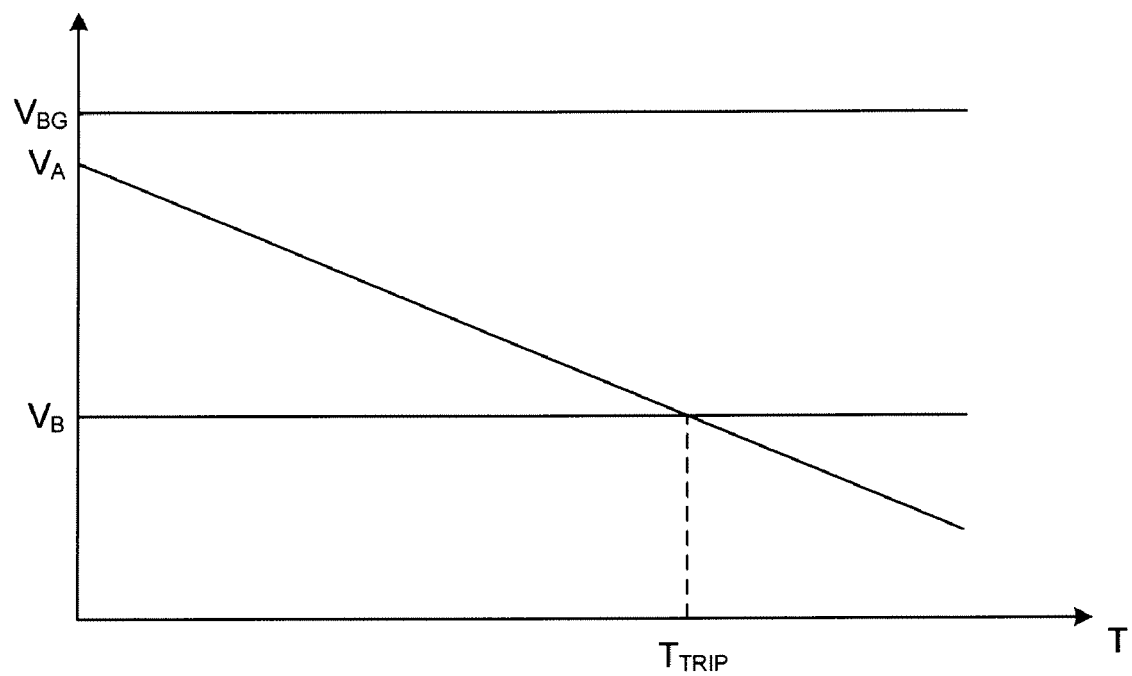
FIG. 3 is a diagram depicting operating voltages associated with the thermal shutdown circuit of FIG. 2.

In accordance with the present invention, thermal shutdown circuit (sensor) 130A includes an op amp (comparator) 135A having a non-inverting (+) terminal connected to receive a temperature dependent voltage $V_A$, and a inverting (−) terminal connected to receive a temperature independent voltage $V_B$. In the present embodiment, temperature dependent voltage $V_A$ is generated by tapping node $N_{34}$ between resistors $R_3$ and $R_4$ of bandgap reference circuit 110A (e.g., corresponding to node N21 between resistor R21 and R22 of resistor R2; see FIG. 5). As such, temperature dependent voltage $V_A$ is referenced to bandgap reference voltage $V_{bg}$, and is proportional to absolute temperature $V_{PTAT}$ (specifically, $V_{PTAT}$ equals $V_{bg}-V_A$). Similarly, temperature independent voltage $V_B$ is tapped from the node between resistors $R_5$ and $R_6$ of functional circuit 120. As such, temperature independent voltage $V_B$ is also referenced to bandgap reference voltage $V_{bg}$. As depicted in FIG. 3, with this arrangement, op amp 135A generates a thermal shutdown signal TSD at its output terminal when temperature dependent voltage $V_A$ decreases to the point at which it equals temperature independent voltage $V_B$. That is, as when IC 100A reaches a predetermined unsafe operating temperature, temperature dependent voltage $V_A$ equals temperature independent voltage $V_B$, causing op amp 135A to transmit thermal shutdown signal TSD to functional circuit 120. As indicated in FIG. 3, predetermined unsafe operating temperature $T_{TRIP}$ (i.e., the temperature at which digital thermal shutdown signal TSD is tripped) is determined by selecting appropriate values for resistances $R_3$, $R_4$, $R_5$ and $R_6$, bandgap reference voltage $V_{bg}$, bias current $I_1$ and $I_2$ and diode ratio Q2:Q1. That is, the temperature $T_{TRIP}$ at which op amp 135A asserts thermal shut-down signal TSD is dependent on how the voltages $V_A$ and $V_B$ are selected, but crucially they must remain referenced to bandgap reference voltage $V_{bg}$ so that they are trimmed correctly.

According to an embodiment of the present invention, thermal trip temperature $T_{TRIP}$ is calculated as follows:

$$V_{PTAT} = V_{bg} - V_A; \quad \frac{V_{PTAT}}{R_4} = \frac{\Delta V_{be}}{R_1} \Rightarrow V_{PTAT} = \Delta V_{be} \cdot \frac{R_4}{R_1} \qquad \text{Eq. 4}$$

$$V_{CONST} = V_{bg} - V_B = V_{bg} - V_{bg} \cdot \frac{R_6}{R_5 + R_6} = \qquad \text{Eq. 5}$$

$$V_{bg}\left(1 - \frac{R_6}{R_5 + R_6}\right) = V_{bg} \cdot \frac{R_5}{R_5 + R_6}$$

$T_{TRIP}$ occurs when $V_A = V_B \Rightarrow V_{PTAT} = V_{CONST}$ Eq. 6

$$\Rightarrow \Delta V_{be} \cdot \frac{R_4}{R_1} = V_{bg} \cdot \frac{R_5}{R_5 + R_6} \qquad \text{Eq. 7}$$

now $\Delta V_{be} = V_{be1} - V_{be2} = V_T \ln\left(\frac{I_1}{I_{S1}} \frac{I_{S2}}{I_2}\right)$ Eq. 8

In our example $I_1 = 2I_2$ and $I_{S2} = N \cdot I_{S1} \Rightarrow \Delta V_{be} =$ $$V_T \ln 2N = \frac{kT}{q} \ln 2N$$

re-arranging for $T$ and substituting Eq. 7 into Eq. 8 gives:

$$T_{TRIP} = V_{bg} \cdot \frac{R_5}{R_5 + R_6} \cdot \frac{R_1}{R_4} \cdot \frac{q}{k \ln 2N} \qquad \text{Eq. 9}$$

The resistor, diode and current ratios are well matched, and q and k are constants so the trip temperature is only dependent on $V_{bg}$ variation. Trimming $V_{bg}$ allows this variable to be well maintained to within an arbitrary percentage range, resulting in a trip temperature with approximately the same percentage range, regardless of process variation.

Example values are inserted into Equation 9 (above) as follows:

$R_1$=96.4 k
$R_2$=224.9 k
$R_3$=32.1 k
$R_4$=417.7 k $$V_{bg} \cdot \frac{R_5}{R_5 + R_6} = 435 \text{ mV}$$

N=8
$T_{TRIP}$=420K=147° C.

As set forth above, thermal shutdown circuit 130A provides an accurate thermal trip point simply by adding comparator 135A to an existing bandgap design, and connecting the input terminals of op amp 135A to carefully selected nodes that are referenced to bandgap reference voltage $V_{bg}$. That is, the present invention may be incorporated into existing integrated circuits having bandgap reference circuits by adding op amp 135A and providing metal lines between nodes on which temperature dependent voltage $V_A$ and temperature independent voltage $V_B$ are generated. Because the present invention only requires the addition of an op amp (or other comparator circuit) and associated connections, the present invention is implemented using a smaller amount of costly silicon area and exhibits lower power consumption in comparison to conventional thermal shutdown approaches that utilize a dedicated thermistor and associated bias circuitry.

Although the present invention has been described with respect to certain specific embodiments, it will be clear to those skilled in the art that the inventive features of the present invention are applicable to other embodiments as well, all of which are intended to fall within the scope of the present invention.

The invention claimed is:

1. An integrated circuit including:
   a bandgap reference circuit for generating a bandgap reference voltage and a temperature dependent voltage that varies in proportion to an ambient temperature of said integrated circuit and is referenced to said bandgap reference voltage;
   means for generating a temperature independent voltage that is independent of said ambient temperature of said integrated circuit and is referenced to said bandgap reference voltage, and
   a thermal sensor including means for comparing said temperature independent voltage and said temperature dependent voltage, and for generating a control signal based on a predetermined relationship between said temperature dependent voltage and said temperature independent reference voltage,
   wherein said thermal sensor comprises a thermal shutdown circuit including means for generating a thermal shutdown signal when said temperature dependent voltage is equal to said temperature independent voltage,
   wherein said thermal shutdown circuit comprises a first operational amplifier including an inverting input terminal connected to receive said temperature dependent voltage, and a non-inverting input terminal connected to receive said temperature independent voltage, and
   wherein said bandgap reference circuit comprises:
      a second operational amplifier having an output terminal, an inverting input terminal, and a non-inverting input terminal;
      a first resistor and a first diode connected in series between the output terminal of the second operational amplifier and ground, wherein the non-inverting input terminal of the second operational amplifier is connected to a first node disposed between said first resistor and said first diode; and
      a second resistor, a third resistor, a fourth resistor, and a second diode connected in series between the output terminal of the second operational amplifier and ground, wherein the inverting input terminal of the second operational amplifier is connected to a second node disposed between said second and third resistors,
      wherein the inverting input terminal of the first operational amplifier is connected to a third node disposed between said third and fourth resistors.

2. The integrated circuit according to claim 1, wherein said means for generating a temperature independent voltage comprises a voltage divider connected between said bandgap reference voltage and ground.

3. The integrated circuit according to claim 1,
   wherein said means for generating said temperature independent voltage comprises a voltage divider including a fifth resistor and a sixth resistor connected between the output terminal of the second operational amplifier and ground, and
   wherein the non-inverting input terminal of the first operational amplifier is connected to a fourth node disposed between said fifth and sixth resistors.

4. An integrated circuit including:
a bandgap reference circuit for generating a bandgap reference voltage and a temperature dependent voltage that is referenced to said bandgap reference voltage and is proportional to an ambient temperature of said integrated circuit; and
a thermal shutdown circuit including means for comparing a temperature independent voltage that is referenced to said bandgap reference voltage and is independent of said ambient temperature of said integrated circuit with said temperature dependent voltage, and for generating a thermal shutdown signal when the temperature dependent voltage is equal to the temperature independent voltage,
wherein said thermal shutdown circuit comprises a first operational amplifier including an inverting input terminal connected to receive said temperature dependent voltage, and a non-inverting input terminal connected to receive said temperature independent voltage, and
wherein said bandgap reference circuit comprises:
  a second operational amplifier having an output terminal, a non-inverting input terminal, and a non-inverting input terminal;
  a first resistor and a first diode connected in series between the output terminal of the second operational amplifier and ground, wherein the non-inverting input terminal of the second operational amplifier is connected to a first node disposed between said first resistor and said first diode; and
  a second resistor, a third resistor, a fourth resistor, and a second diode connected in series between the output terminal of the second operational amplifier and ground, wherein the inverting input terminal of the second operational amplifier is connected to a second node disposed between said second and third resistors,
wherein the inverting input terminal of the first operational amplifier is connected to a third node disposed between said third and fourth resistors.

5. The integrated circuit according to claim 4, further comprising a voltage divider including a fifth resistor and a sixth resistor connected between the output terminal of the second operational amplifier and ground, and
wherein the non-inverting input terminal of the first operational amplifier is connected to a fourth node disposed between said fifth and sixth resistors.

6. An integrated circuit comprising:
a thermal sensor comprising a first operational amplifier;
a bandgap reference circuit including
  a second operational amplifier having an output terminal, an inverting input terminal, and a non-inverting input terminal,
  a first resistor and a first diode connected in series between the output terminal of the second operational amplifier and ground, wherein a the non-inverting input terminal of the second operational amplifier is connected to a first node disposed between said first resistor and said first diode, and
  a second resistor, a third resistor, a fourth resistor, and a second diode connected in series between the output terminal of the second operational amplifier and ground, wherein the inverting input terminal of the second operational amplifier is connected to a second node disposed between said second and third resistors; and
a voltage divider including a fifth resistor and a sixth resistor connected between the output terminal of the second operational amplifier and ground,
wherein a first input terminal of the first operational amplifier is connected to a third node disposed between said third and fourth resistors, and
wherein a second input terminal of the first operational amplifier is connected to a fourth node disposed between said fifth and sixth resistors.

* * * * *